(12) United States Patent
Byrnes, Jr. et al.

(10) Patent No.: US 10,718,372 B2
(45) Date of Patent: Jul. 21, 2020

(54) DUST BOOT FOR A MOVEABLE JOINT

(71) Applicant: FEDERAL-MOGUL MOTORPARTS LLC, Southfield, MI (US)

(72) Inventors: Thomas J. Byrnes, Jr., St. Charles, MO (US); Steven D. Schmitt, Shobonier, IL (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 223 days.

(21) Appl. No.: 15/649,042

(22) Filed: Jul. 13, 2017

(65) Prior Publication Data

US 2019/0017540 A1   Jan. 17, 2019

(51) Int. Cl.
*F16C 11/00* (2006.01)
*F16C 11/06* (2006.01)

(52) U.S. Cl.
CPC ...... *F16C 11/0671* (2013.01); *F16C 11/0604* (2013.01); *F16C 2300/02* (2013.01)

(58) Field of Classification Search
CPC ......... Y10T 403/315; Y10T 403/32729; Y10T 403/32631; F16C 11/0671; F16C 11/068; F16C 11/0604; F16C 2300/02
See application file for complete search history.

(56) References Cited

U.S. PATENT DOCUMENTS

| | | | |
|---|---|---|---|
| 1,959,259 A | 5/1934 | Zerk | |
| 2,304,732 A | 12/1942 | Flumerfelt | |
| 3,279,832 A | 10/1966 | Bergman | |
| 3,451,700 A | 6/1969 | Smith | |
| 3,596,915 A | 8/1971 | Snidar | |
| 4,043,564 A | 8/1977 | White | |
| 5,046,745 A | 9/1991 | Sweetland et al. | |
| 6,582,146 B2 | 6/2003 | Raymoure | |
| 7,354,349 B2 | 4/2008 | Wette | |
| 7,670,078 B2 | 3/2010 | Elterman et al. | |
| 7,699,710 B2 | 4/2010 | Wette | |
| 7,704,007 B2 | 4/2010 | Elterman et al. | |
| 7,762,123 B2 * | 7/2010 | Helasuo | F16J 15/52 285/227 |
| 7,992,876 B2 | 8/2011 | Aktuerk et al. | |
| 8,313,107 B2 | 11/2012 | Hoets et al. | |
| 8,393,624 B2 | 3/2013 | Hoets et al. | |
| 2016/0025129 A1 | 1/2016 | Parker et al. | |

(Continued)

FOREIGN PATENT DOCUMENTS

DE    102017200757 A1 *  7/2018  .......... F16C 11/0671
FR       2742196 A1 *  6/1997  .......... F16C 11/0671

*Primary Examiner* — Matthew R McMahon
(74) *Attorney, Agent, or Firm* — Steven Hurles (57) ABSTRACT

A dust boot for a moveable joint is provided. The dust boot includes a boot body disposed annularly about an axis and defining an interior cavity. The boot body has a housing opening at a first longitudinal end for attaching to a housing and a shank opening at a second longitudinal end opposite the first longitudinal end for sealingly engaging a shank portion of a ball stud of the ball and socket joint assembly. The boot body defines a plurality of longitudinal strengthening portions formed therein and extending longitudinally at an acute angle relative to the axis in a relaxed condition of the dust boot for resisting rotation of the dust boot in response to a rotation of the ball stud and for improving sealing of the dust boot with the shank portion of the ball stud.

5 Claims, 8 Drawing Sheets

(56) References Cited

U.S. PATENT DOCUMENTS

2018/0245623 A1* 8/2018 Reddehase .......... F16C 11/0671
2018/0245624 A1* 8/2018 Reddehase .............. F16C 41/04
2019/0017541 A1* 1/2019 Byrnes, Jr. .......... F16C 11/0671

* cited by examiner

DUST BOOT FOR A MOVEABLE JOINT

BACKGROUND OF THE INVENTION

1. Field of the Invention

The present disclosure is related to a boot type seal, especially adapted for ball and socket type joints, although useful in any installation for sealing relatively articulatable, tiltable, or rotatable members while resisting twisting.

2. Related Art

Dust boots are commonly made of rubber or other similar materials are often used on moveable ball socket joints to seal the socket by preventing contaminants from entering the socket and to prevent lubricants from escaping the socket. Such sockets typically include a housing and a stud which are pivotable relative to one through a wide range of motion.

The dust boot must maintain seals with both the housing and the stud through the full range of motion of the housing and stud relative to one another. In order to carry out its intended function, the dust boot must seal adequately. However, because of the flexible nature of the materials used to construct the dust boot, dust boots generally have difficulty providing a proper seal, especially where they engage the stud.

Additionally, because fasteners are usually attached to the stud, the dust boot can become vulnerable to damage in the event that it is twisted, for example, due to rotation of the stud while the fastener is secured. Thus, there remains a need for improvements to such dust boots to provide for improved sealing with the housing and the stud, while also resisting rotation.

SUMMARY OF THE INVENTION AND ADVANTAGES

An aspect of the present disclosure provides for an improved dust boot for a ball and socket joint assembly. The dust boot includes a boot body disposed annularly about an axis and defining an interior cavity. The boot body has a housing opening at a first longitudinal end for attaching to a housing and a shank opening at a second longitudinal end opposite the first longitudinal end for sealingly engaging a shank portion of a ball stud of the ball and socket joint assembly. The boot body defines a plurality of longitudinal strengthening portions formed therein and extending longitudinally at an acute angle relative to the axis in a relaxed condition of the dust boot for resisting rotation of the dust boot in response to a rotation of the ball stud and for improving sealing of the dust boot with the shank portion of the ball stud.

In another aspect of the present disclosure, a ball and socket joint assembly is provided. The ball and socket joint assembly includes a housing extending along and annularly disposed about an axis and defining an inner chamber. A ball stud includes a ball portion being generally ball-shaped with a second diameter at one longitudinal end disposed within the inner chamber and a shank portion extending axially from the ball portion out of the housing and is pivotable relative to the housing. A dust boot includes a boot body and is disposed annularly about the axis and defines an interior cavity. The boot body has a housing opening at a first longitudinal end of the boot body for attaching to the housing and a shank opening at a second longitudinal end of the boot body opposite the first longitudinal end for seal- ingly engaging the shank portion of the ball stud for blocking contaminants from the interior cavity. The boot body additionally defines a plurality of longitudinal strengthening portions formed therein. The plurality of longitudinal strengthening portions extend longitudinally at an acute angle relative to the axis in a relaxed condition of the dust boot for resisting rotation of the dust boot in response to a rotation of the ball stud and for improving sealing of the dust boot with the shank portion of the ball stud.

The invention in its broadest aspect therefore affords a ball and socket joint assembly including a dust boot that provides resistance to rotation and improves sealing with the housing and the stud.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENTS

One or more example embodiments of a dust boot for moveable joint assemblies constructed in accordance with the present disclosure will now be more fully described. These example embodiments are generally directed to dust boots and moveable joints incorporating such dust boots. Specifically, the dust boots are shown as part of a ball and socket joint assembly. However, the dust boots described could be useful in any installation for sealing relatively articulatable, tiltable, or rotatable members. To this end, numerous specific details are set forth as examples of specific components, devices and mechanisms associated with dust boots and moveable joints to provide a thorough understanding of each of the embodiments associated with the present disclosure. However, as will be apparent to those skilled in the art, not all specific details described herein need to be employed, the example embodiments may be embodied in many different forms, and that neither should be construed or interpreted to limit the scope of the disclosure.

Referring to the Figures, wherein like numerals indicate corresponding parts throughout the several views, a moveable joint assembly (e.g., ball and socket joint assembly 20) and example embodiments of corresponding dust boots 22 are disclosed. FIGS. 1-4 illustrate a first exemplary embodiment of ball and socket joint assembly 20 including a housing 24 that extends along and is annularly disposed about an axis A. The housing 24 defines an inner chamber 26. A bearing 28 (FIG. 2) defines a curved inner surface 30 of a first diameter and is disposed in the inner chamber 26. While the bearing 28 can be separate from the housing 24, it should be appreciated that the housing 24 and bearing 28 could alternatively be integrally formed. The housing 24 may also include an optional radially outwardly extending flange 32 disposed at one axial end of the housing 24 for aiding in the installation of the ball and socket joint assembly 20 in a mounting opening (e.g., an opening in a control arm to which the ball and socket joint assembly 20 is attached).

The ball and socket joint assembly 20 includes a ball stud 34 that has a ball portion 36 that is generally ball-shaped with a second diameter at one longitudinal end disposed within the inner chamber 26 and engaging the curved inner surface 30 of the bearing 28. The first diameter of the curved inner surface 30 of the bearing 28 corresponds to the second diameter of the ball portion 36 of the ball stud 34 to allow for sliding contact between the curved inner surface 30 of the bearing 28 and the ball portion 36 of the ball stud 34. The ball stud 34 also includes a shank portion 38 extending axially from the ball portion 36 out of a stud exit end 40 of the housing 24 for connecting to a steering knuckle or other feature and is pivotable relative to the housing 24. A nut (not shown) can thread onto the end of stud to hold the steering knuckle (or other chassis component) securely on a tapered fitting of the stud. A lubricant 42 is disposed in the inner chamber 26 of the housing 24 to provide a low friction interface between the curved inner surface 30 of the bearing 28 and the ball portion 36 of the ball stud 34. Nevertheless, it should be understood that a lubricant could be omitted.

The ball and socket joint assembly 20 also includes a dust boot 22. The dust boot 22 includes a domed shaped boot body 44 disposed annularly about the axis A and defines an interior cavity 46. The dust boot 22 is generally formed from an elastomer, such as natural or synthetic rubber and the like, or various plastics. Nevertheless, any suitably elastically deflectable material having inherent resiliency tending to reclaim its original molded shape upon deformation although accommodating such deformation without appreciable resistance may be chosen.

In the exemplary embodiment, the boot body 44 of the dust boot 22 defines a large opening or housing opening 48 at a first longitudinal end 50 of the boot body 44 adapted to fit tightly and seal against an outer surface of the housing 24 adjacent the stud exit end 40. The housing opening 48 of the dust boot 22 can be reinforced with a rigid ring (not shown) made from any rigid material, a metal such as zinc or cadmium plated steel, or various rigid plastics. Alternately, the first longitudinal end of the boot body may be received into the inner chamber of the housing and sealed against an inner surface thereof.

The boot body 44 also defines a smaller opening or shank opening 52 at a second longitudinal end 54 of the boot body 44 opposite the first longitudinal end 50 for sealingly engaging the shank portion 38 of the ball stud 34 for blocking contaminants from the interior cavity 46 and retaining the lubricant in the inner chamber 26 of the housing 24. As with the housing opening 48, the shank opening 52 can also include an insert, preferably a rigid insert. The insert can be fitted into a retaining channel molded into the body of the dust boot 22 and serves to add rigidity to the small end of the dust boot 22. Other stiffening or reinforcing techniques may also be possible so that the use of a separate insert per se can be optional. For example, the boot body 44 and insert may be co-molded in the same mold using different materials and/or processing techniques.

The dust boot 22 also includes an upper boot wall 56 extending axially away from the boot body 44 at the second longitudinal end 54 and disposed coaxially with the shank opening 52. The dust boot 22 additionally includes a boot flange 58 extending radially from the boot body 44 at the first longitudinal end 50 and annularly about the housing opening 48. While dust boot 22 as shown herein is in a dome shape, it should be appreciated that the dust boot 22 may have other shape configurations instead of being domed, such as, but not limited to a stepped or capped cylinder, or convolute shape.

The boot body 44 defines a plurality of longitudinal strengthening portions 60 formed therein. In detail, the plurality of longitudinal strengthening portions 60 extend longitudinally at an acute angle α (preferably, approximately 45 degrees) relative to the axis A in a relaxed condition of the dust boot 22 (i.e., when the dust boot 22 is not twisted or deformed in any way from its initially formed state) for resisting rotation of the dust boot 22 in response to a rotation of the ball stud 34 and for improving sealing of the dust boot 22 with the shank portion 38 of the ball stud 34.

Figure 1:
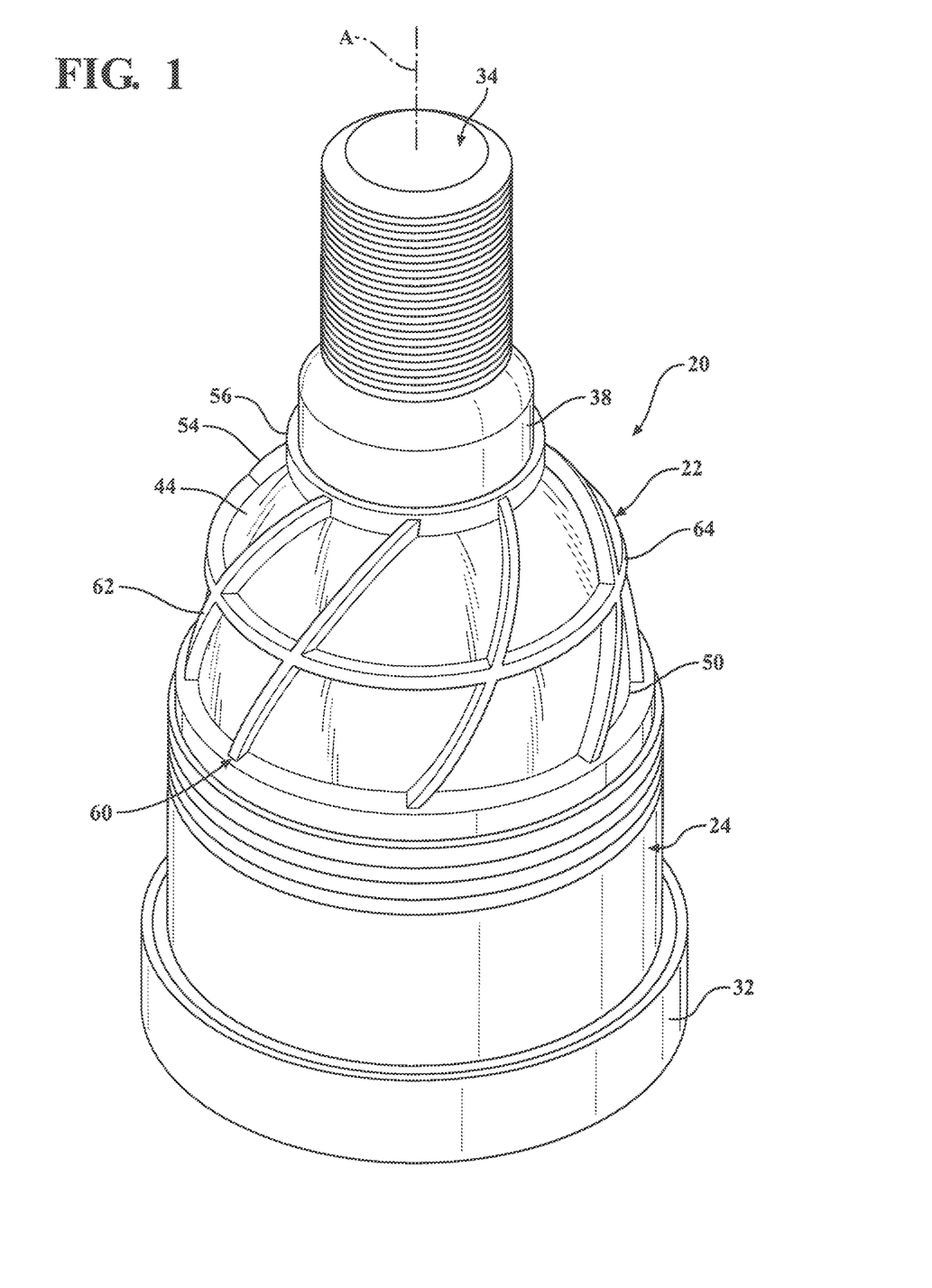
FIG. 1 is a perspective view of a ball and socket joint assembly including a first exemplary embodiment of a dust boot.
Figure 2:
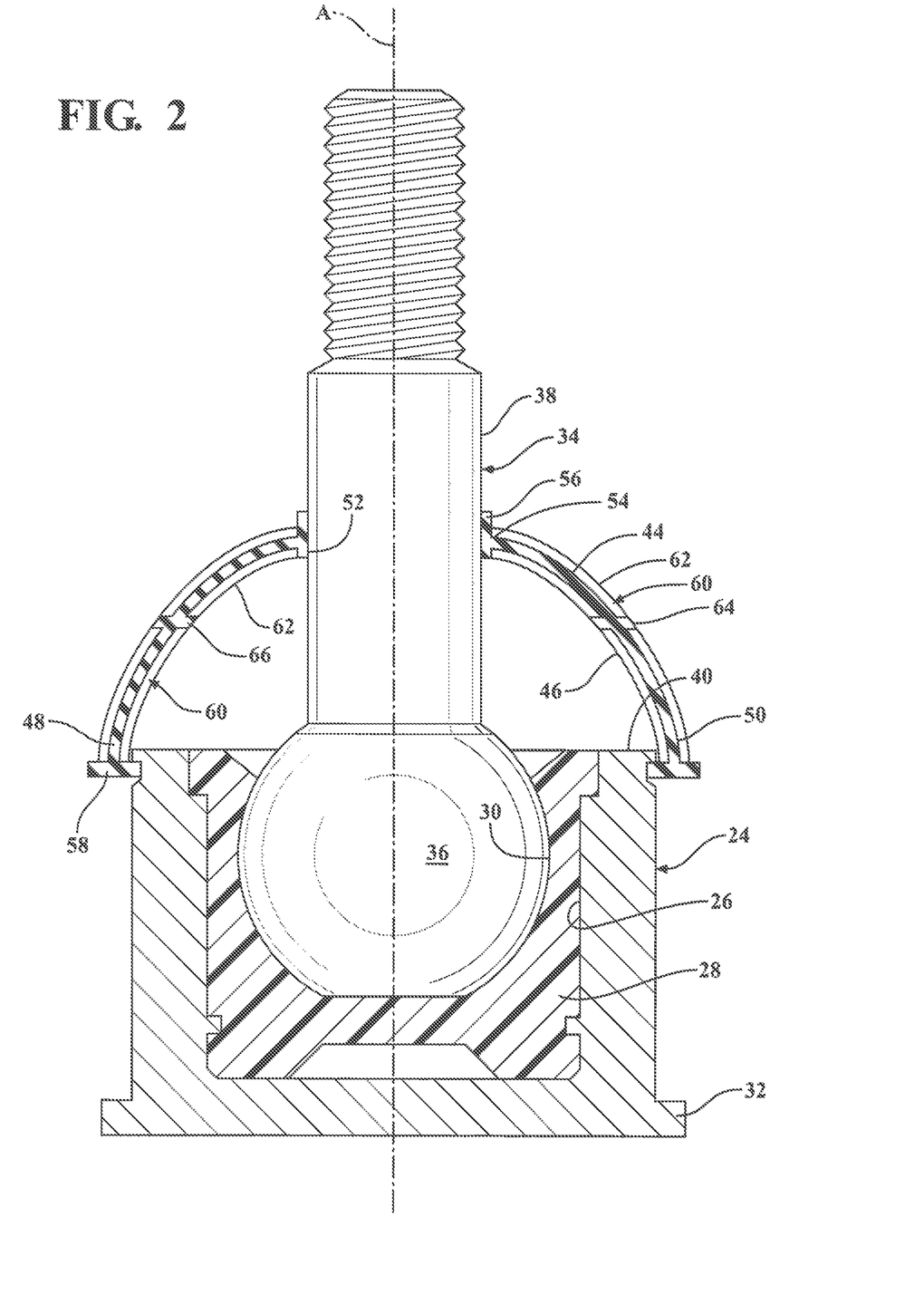
FIG. 2 is a cross-sectional view of the ball and socket joint assembly of FIG. 1.
Figure 3:
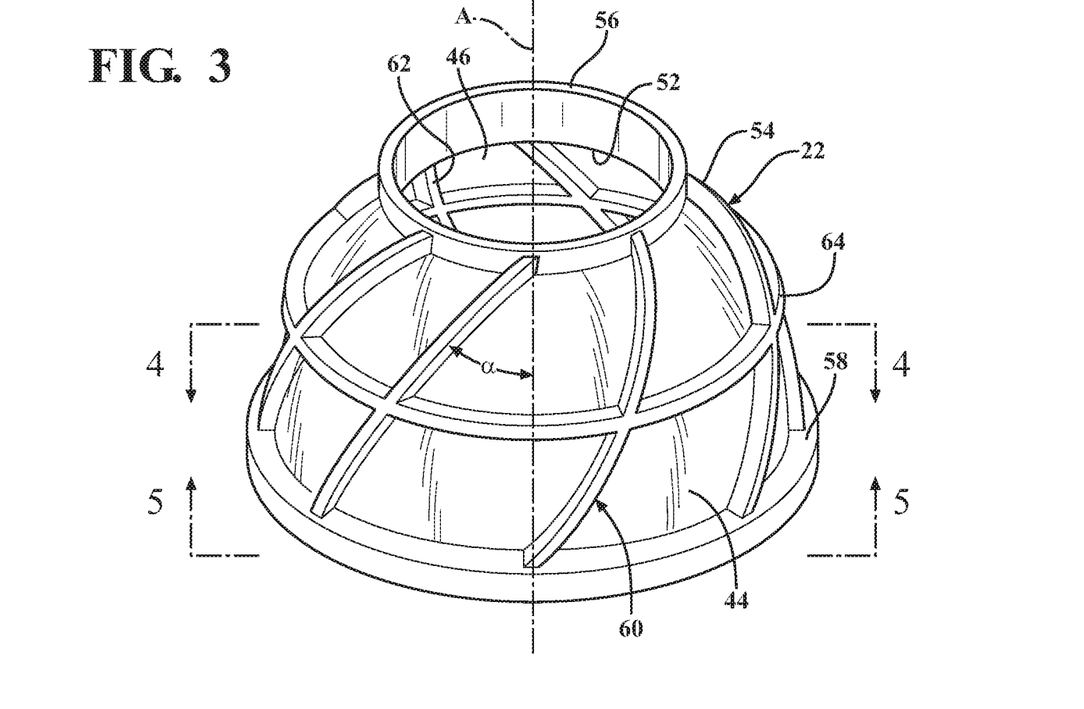
FIG. 3 is a perspective view of a dust boot of the ball and socket joint assembly of FIG. 1.
Figure 4:
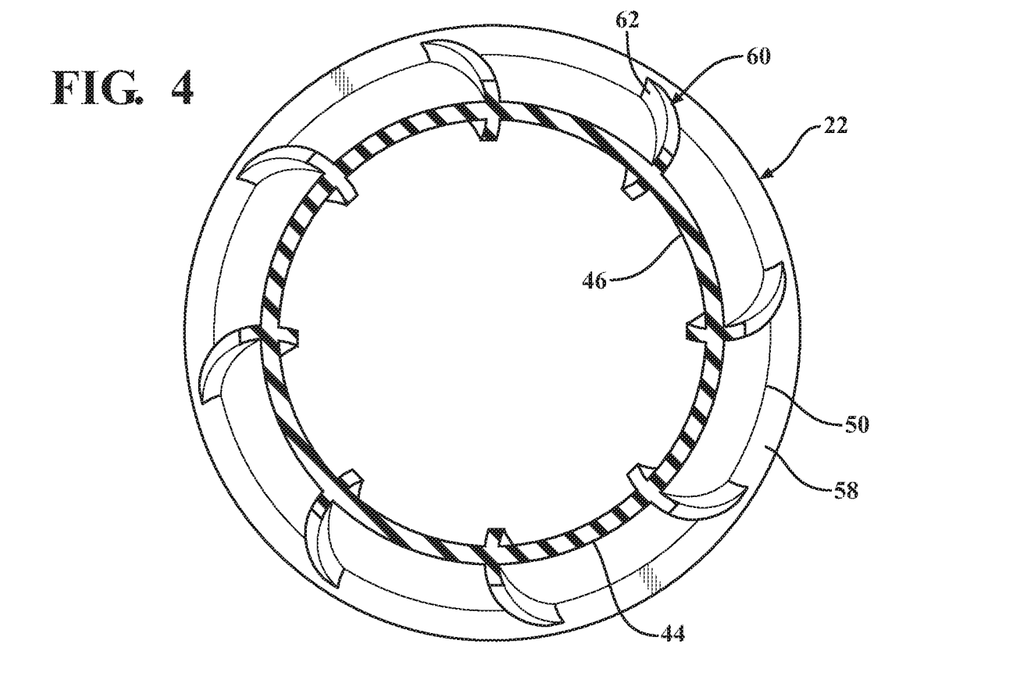
FIG. 4 is a cross-sectional view of the dust boot of FIG. 3 taken along line 4-4.

As best shown in FIGS. 3 and 4, the plurality of longitudinal strengthening portions 60 of the dust boot 22 include a plurality of gussets 62 extending radially outwardly from the boot body 44. The acute angle α can be 45 degrees, for example, but other acute angles α are additionally contemplated. The boot body 44 further includes at least one outer transverse strengthening portion 64 disposed between the first longitudinal end 50 and the second longitudinal end 54 and extending circumferentially around and extending radially outwardly from the boot body 44.

Figure 5:
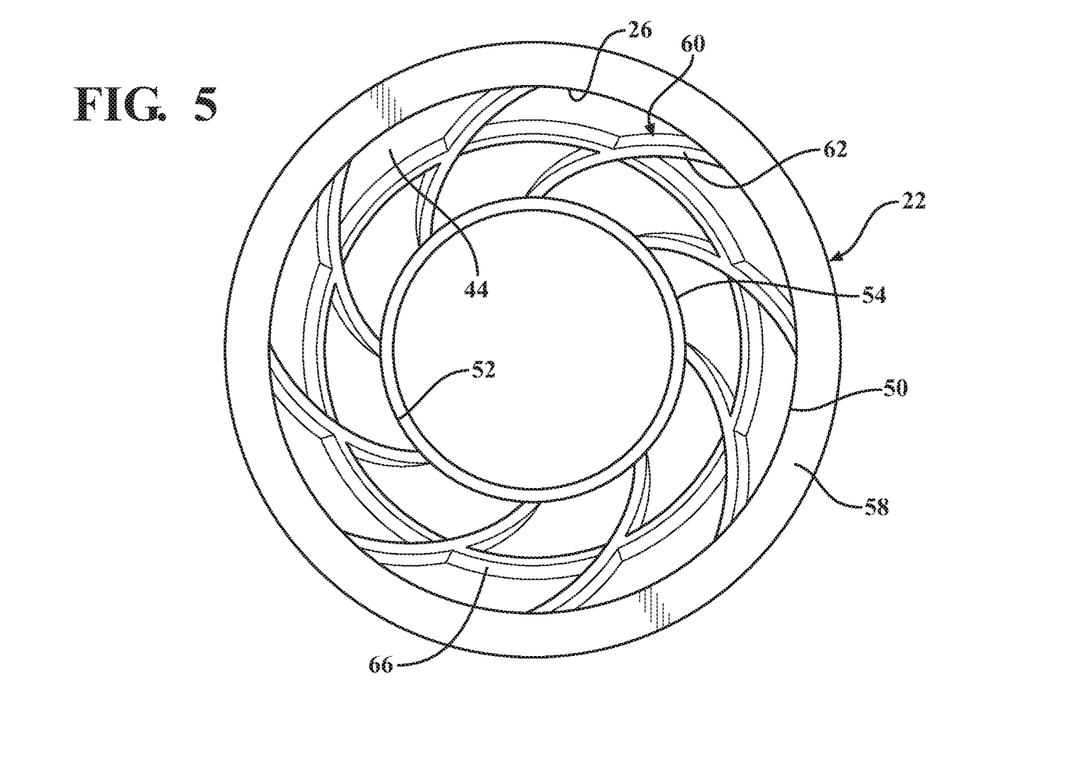
FIG. 5 is a bottom view of the dust boot of FIG. 3 taken along line 5-5.

The dust boot 22 may also include a plurality of longitudinal strengthening portions 60 disposed in the interior cavity 46 of the boot body 44 of the dust boot 22 (FIG. 5). For example, the plurality of longitudinal strengthening portions 60 can include a plurality of gussets 62 extending radially inwardly from the boot body 44. The boot body 44 further includes at least one inner transverse strengthening portion 66 extending circumferentially around and disposed between the first longitudinal end 50 and the second longitudinal end 54 and extending radially inwardly from the boot body 44. While the plurality of gussets 62 in the interior cavity 46 are shown as being utilized in addition to the gussets 62 extending radially outwardly from the boot body 44, it should be appreciated that only the plurality of gussets 62 in the interior cavity 46 or the plurality of gussets 62 extending radially outwardly from the boot body 44 could be utilized instead.

Figure 6:
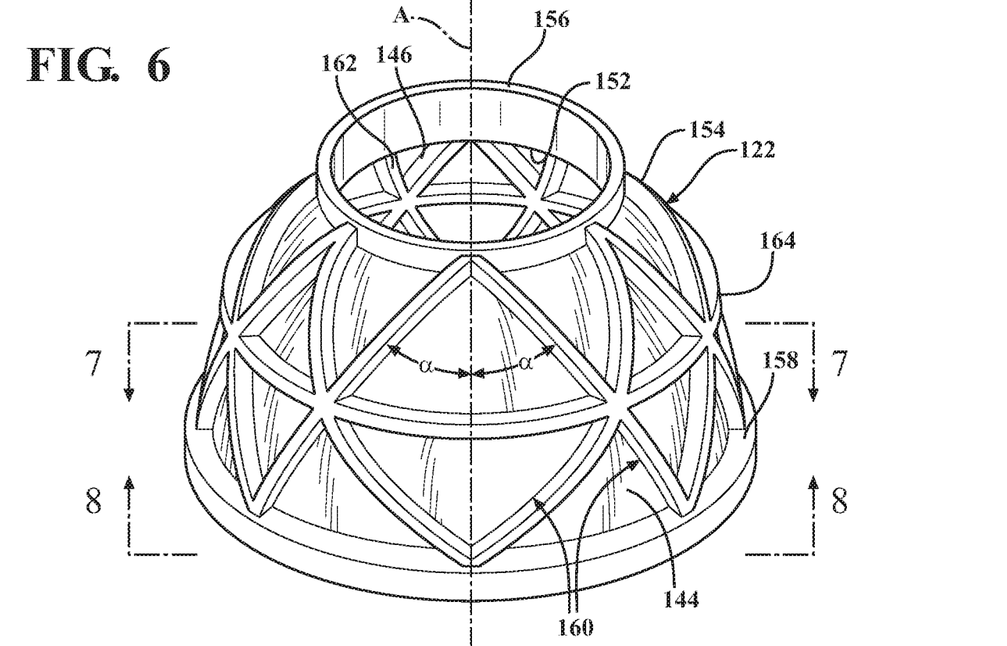
FIG. 6 is a perspective view of a dust boot of a second exemplary embodiment of a ball and socket joint assembly.
Figure 7:
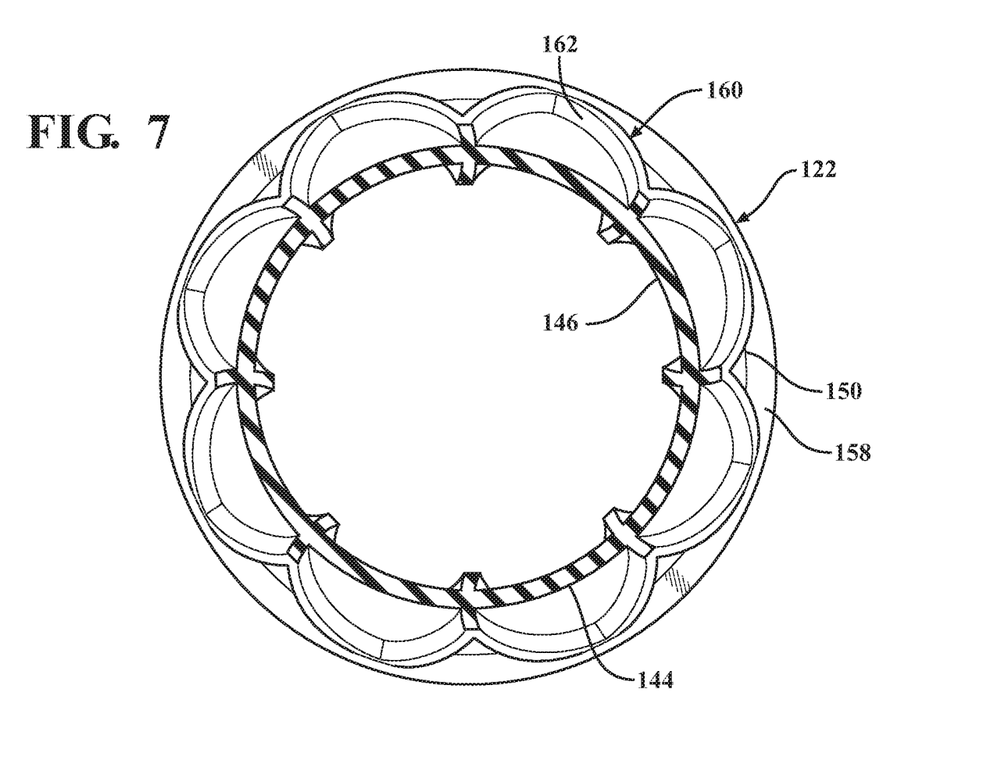
FIG. 7 is a cross-sectional view of the dust boot of FIG. 6 taken along line 7-7.
Figure 8:
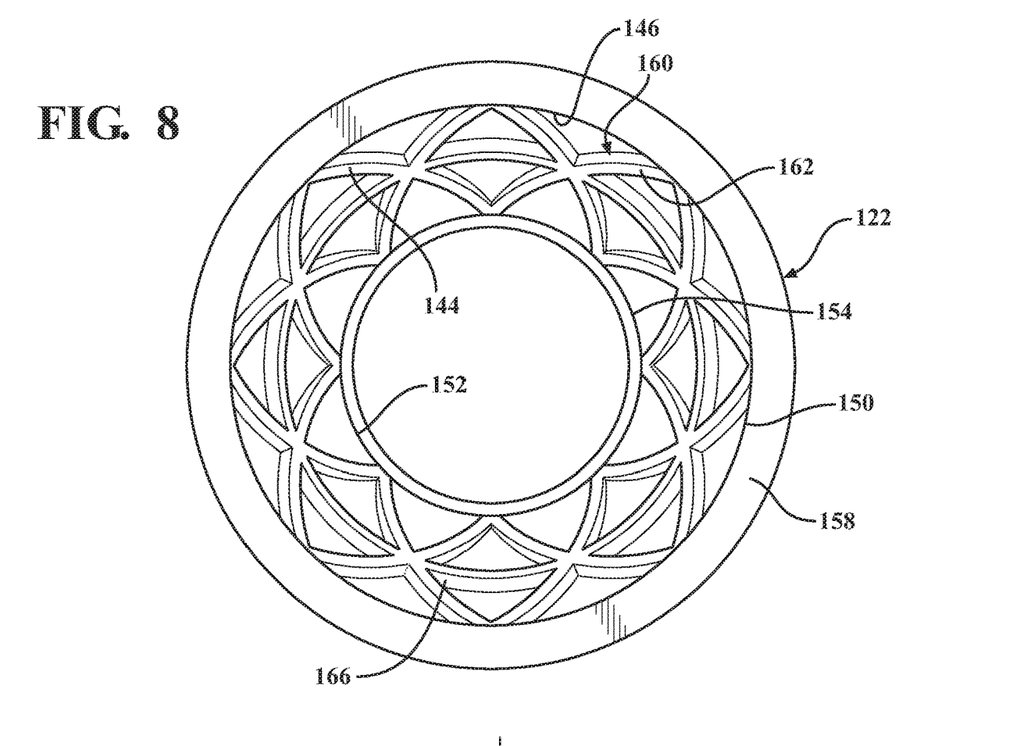
FIG. 8 is a bottom view of the dust boot of FIG. 6 taken along line 8-8.

A second exemplary embodiment of the dust boot 122 is shown in FIGS. 6-8, with like numerals separated by a prefix of "1", being used to show features corresponding to the first exemplary embodiment discussed above. The plurality of longitudinal strengthening portions 160 of the second embodiment of the ball and socket joint assembly 120 include a plurality of gussets 162 extending radially outwardly from the boot body 144. The plurality of gussets 162 include a plurality gussets 162 extending longitudinally at an acute angle α (e.g., 45 degrees) clockwise relative to the axis A in a relaxed condition of the dust boot 122 and a plurality extending longitudinally at an acute angle α (e.g., 45 degrees) counterclockwise relative to the axis A. The boot body 144 also includes at least one outer transverse strengthening portion 164 disposed between the first longitudinal end 150 and the second longitudinal end 154 and extending circumferentially around and extending radially outwardly from the boot body 144. The plurality of longitudinal strengthening portions 160 also include a plurality of gussets 162 extending radially inwardly from the boot body 144 (i.e., into the interior cavity 146) in both the clockwise and counterclockwise directions. The boot body 144 also includes at least one inner transverse strengthening portion 166 extending circumferentially around the boot body 144 and disposed between the first longitudinal end 150 and the second longitudinal end 154 and extending radially inwardly from the boot body 144.

Figure 9:
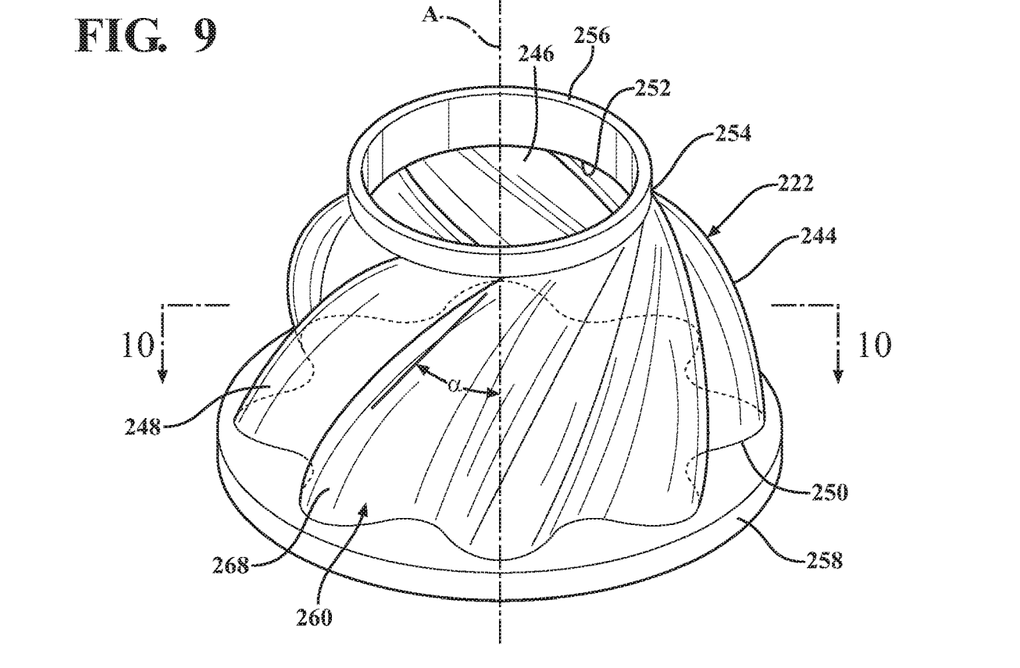
FIG. 9 is a perspective view of a dust boot of a third exemplary embodiment of a ball and socket joint assembly.
Figure 10:
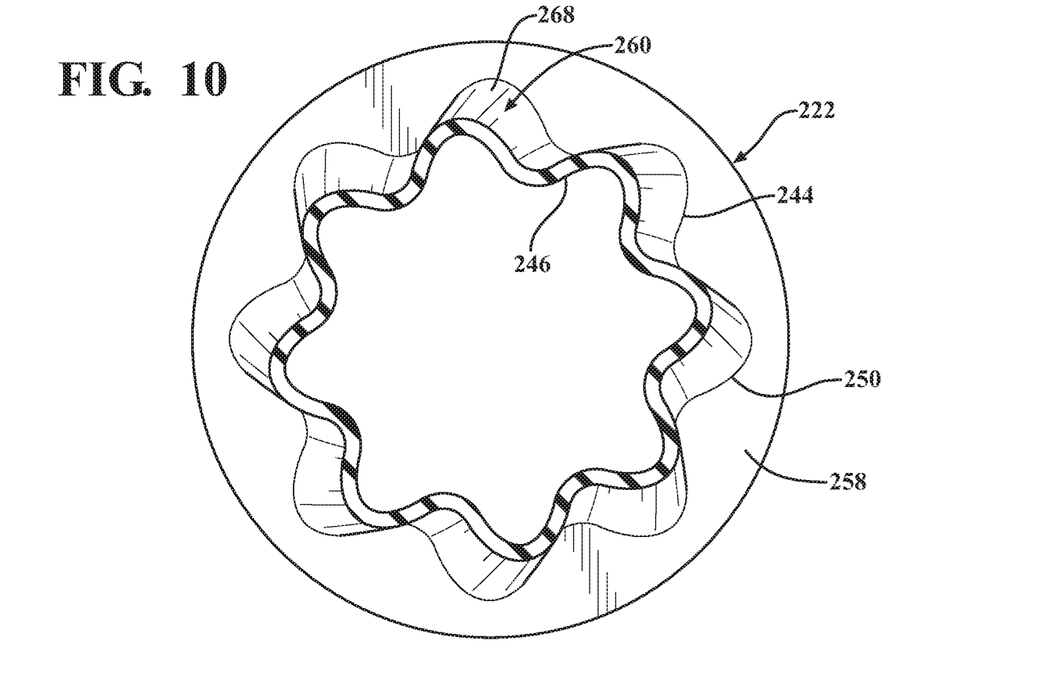
FIG. 10 is a cross-sectional view of the dust boot of FIG. 9 taken along line 10-10.

A third exemplary embodiment of the dust boot 222 is shown in FIGS. 9 and 10, with like numerals separated by a prefix of "2", being used to show features corresponding to the first exemplary embodiment discussed above. The plurality of longitudinal strengthening portions 260 of the second embodiment of the ball and socket joint assembly 220 include a plurality of waves 268. As with the first embodiment, the waves 268 of the dust boot 222 in this embodiment also extend at an acute angle α (preferably 45 degrees).

Figure 11:
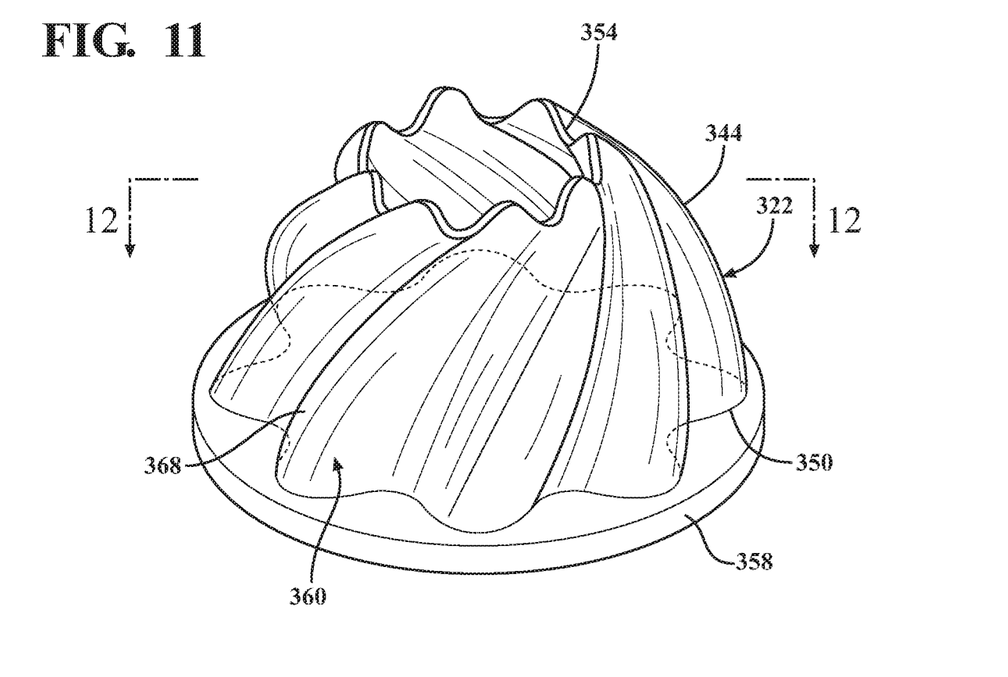
FIG. 11 is a perspective view of a fourth exemplary embodiment of a dust boot of a ball and socket joint assembly.
Figure 12:
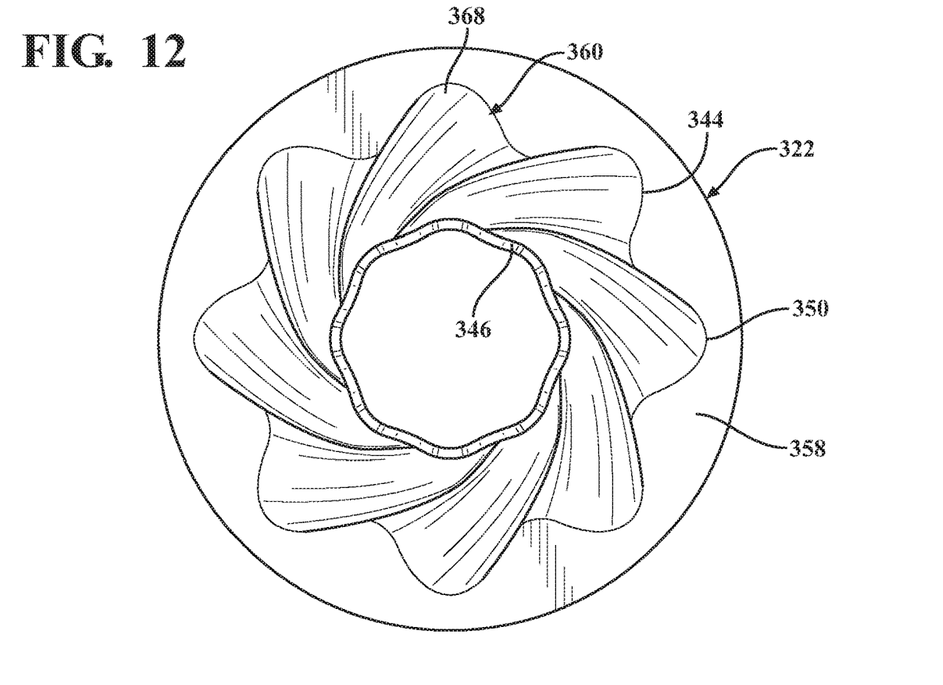
FIG. 12 is a cross-sectional view of the dust boot of FIG. 11 taken along line 12-12.
Figure 13:
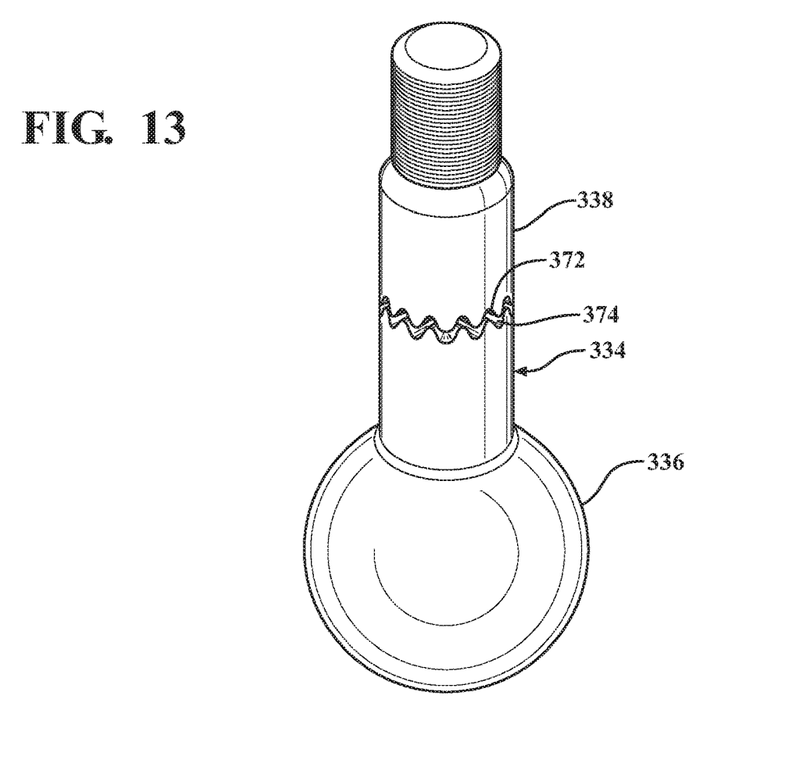
FIG. 13 is a perspective view of a ball stud adapted for use with the fourth exemplary embodiment of the dust boot.

A fourth exemplary embodiment of the dust boot 322 and a ball stud 336 for use therewith are shown in FIGS. 11-13, with like numerals separated by a prefix of "3", being used to show features corresponding to the first exemplary embodiment discussed above. The waves 368 of the dust boot 322 of the fourth embodiment extend into the shank opening 352 of the boot body 344 to define a waved inner surface 370 of the shank opening 352 (FIGS. 11 and 12). The shank portion 338 of the ball stud 334 includes a waved groove 372 extending circuitously about the shank portion 338 and the waved groove 372 defines an irregular surface 374 (FIG. 13) corresponding to the contour of the waved inner surface 370 of the shank opening 352. The waved inner surface 370 of the shank opening 352 engages the irregular surface 374 of the waved groove 372 of the shank portion 338.

Obviously, many modifications and variations of the present invention are possible in light of the above teachings and may be practiced otherwise than as specifically described while within the scope of the appended claims. Additionally, it is to be understood that all features of all claims and all embodiments can be combined with each other, as long as they do not contradict each other.

What is claimed is:

1. A ball and socket joint assembly, comprising:
a housing extending along and annularly disposed about an axis and defining an inner chamber;
a ball stud including a ball portion being generally ball-shaped with a second diameter at one longitudinal end disposed within said inner chamber and a shank portion extending axially from said ball portion out of said housing and pivotable relative to said housing;
a dust boot including a boot body disposed annularly about said axis and defining an interior cavity and having a boot flange, said boot flange extending radially outwardly and defining a housing opening at a first longitudinal end of said boot body for attaching to said housing;
said boot body further including an upper boot wall which is cylindrical in shape and defines a shank opening at a second longitudinal end of said boot body opposite said first longitudinal end for sealingly engaging said shank portion of said ball stud for blocking contaminants from said interior cavity;
said boot body defining a plurality of longitudinal strengthening portions formed therein and extending longitudinally at an acute angle relative to said axis in a relaxed condition of said dust boot such that said boot body resists twisting in response to relative rotation about said axis of said ball stud relative to said housing and for improving sealing of said dust boot with said shank portion of said ball stud; and
a plurality of said longitudinal strengthening portions being gussets which extend radially outwardly from said boot body and which extend a full distance between and are directly connected with said boot flange and said upper boot wall.

2. The ball and socket joint assembly as set forth in claim 1, further including a bearing defining a curved inner surface of a first diameter disposed in said inner chamber of said housing and wherein said ball portion of said ball stud engages said curved inner surface of said bearing and wherein said first diameter of said curved inner surface of said bearing corresponds to said second diameter of said ball portion to allow for sliding contact between the curved inner surface of said bearing and said ball portion of said ball stud.

3. The ball and socket joint assembly as set forth in claim 2, wherein said plurality of longitudinal strengthening portions include a plurality of gussets extending radially inwardly from said boot body.

4. The ball and socket joint assembly as set forth in claim 1, wherein said plurality of longitudinal strengthening portions include a plurality of inner longitudinal strengthening portions that are disposed in said interior cavity.

5. The ball and socket joint assembly as set forth in claim 1, wherein said acute angle is 45 degrees.

* * * * *